United States Patent
Ando et al.

(10) Patent No.: US 12,472,835 B2
(45) Date of Patent: Nov. 18, 2025

(54) ELECTRICALLY POWERED VEHICLE AND METHOD FOR CONTROLLING ELECTRICALLY POWERED VEHICLE

(71) Applicant: TOYOTA JIDOSHA KABUSHIKI KAISHA, Toyota (JP)

(72) Inventors: Toru Ando, Obu (JP); Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/624,269

(22) Filed: Apr. 2, 2024

(65) Prior Publication Data

US 2024/0246431 A1 Jul. 25, 2024

Related U.S. Application Data

(63) Continuation of application No. 17/873,550, filed on Jul. 26, 2022, now Pat. No. 11,970,070, which is a continuation of application No. 17/164,012, filed on Feb. 1, 2021, now Pat. No. 11,427,100.

(30) Foreign Application Priority Data

Feb. 7, 2020 (JP) ................................. 2020-019733

(51) Int. Cl.
*B60L 53/16* (2019.01)
(52) U.S. Cl.
CPC ........... *B60L 53/16* (2019.02); *B60L 2270/30* (2013.01)
(58) Field of Classification Search
CPC ............................. B60L 53/16; B60L 2270/30

USPC .......................................................... 320/107
See application file for complete search history.

(56) References Cited

U.S. PATENT DOCUMENTS

| | | | | |
|---|---|---|---|---|
| 8,000,858 B2* | 8/2011 | Tonegawa | ................. | B60L 3/00 191/2 |
| 8,025,526 B1* | 9/2011 | Tormey | .............. | H01R 13/6397 439/372 |
| 8,565,930 B2* | 10/2013 | Miwa | .................... | H02J 7/0047 141/192 |
| 9,527,391 B2* | 12/2016 | Hockenstrom | ........... | B60L 3/00 |

(Continued)

FOREIGN PATENT DOCUMENTS

| | | | | |
|---|---|---|---|---|
| CN | 103887657 A | * | 6/2014 | .............. B60L 11/14 |
| CN | 107791860 A | * | 3/2018 | .............. B60L 53/16 |

(Continued)

OTHER PUBLICATIONS

Final Office Action dated Aug. 3, 2023, Issued to U.S. Appl. No. 17/873,550, filed Jul. 26, 2022.

(Continued)

*Primary Examiner* — Suresh Memula
(74) *Attorney, Agent, or Firm* — Dinsmore & Shohl LLP

(57) ABSTRACT

An ECU performs processing including: a step of obtaining a pilot signal CPLT and a connector connection signal PISW; a step of determining, when a connector is attached, a type of the connector; a step of controlling, when there is a function corresponding to the type of the attached connector, the connector to be set to a lock state; a step of performing control corresponding to the attached connector; and a step of maintaining, when there is no function corresponding to the type of the attached connector, an unlock state of the connector.

2 Claims, 9 Drawing Sheets

(56) References Cited

U.S. PATENT DOCUMENTS

| | | | |
|---|---|---|---|
| 10,521,987 B1 * | 12/2019 | Jordan, III | G07C 9/00309 |
| 11,247,575 B2 * | 2/2022 | Kojima | B60L 53/66 |
| 11,292,350 B2 * | 4/2022 | Ichikawa | B60L 53/11 |
| 11,292,354 B2 * | 4/2022 | Heuer | H02J 7/00045 |
| 11,427,100 B2 | 8/2022 | Ando | |
| 11,787,300 B1 * | 10/2023 | Kojima | B60K 1/04 320/109 |
| 2010/0079105 A1 * | 4/2010 | Iwanaga | B60L 50/16 320/109 |
| 2011/0022256 A1 * | 1/2011 | Asada | B60L 53/62 701/22 |
| 2011/0057611 A1 * | 3/2011 | Nakaso | B60W 20/15 320/109 |
| 2011/0287649 A1 | 11/2011 | Kurumizawa | |
| 2012/0071017 A1 * | 3/2012 | Gaul | B60L 53/16 439/304 |
| 2012/0112697 A1 * | 5/2012 | Heuer | B60L 53/60 320/109 |
| 2012/0166269 A1 * | 6/2012 | Payne | G07F 15/005 903/902 |
| 2013/0082655 A1 * | 4/2013 | Kamishima | H02J 7/0036 320/109 |
| 2014/0179141 A1 | 6/2014 | Kojima | |
| 2014/0211345 A1 * | 7/2014 | Thompson | H01H 9/548 335/11 |
| 2014/0256172 A1 * | 9/2014 | Kakizaki | B60L 53/16 439/350 |
| 2015/0258904 A1 * | 9/2015 | Moribe | H02J 9/062 320/109 |
| 2015/0375621 A1 * | 12/2015 | Ono | B60L 1/006 307/10.1 |
| 2016/0368391 A1 | 12/2016 | Kojima | |
| 2018/0065495 A1 * | 3/2018 | Masuda | H01R 13/641 |
| 2019/0061538 A1 * | 2/2019 | Kinomura | H02G 3/0625 |
| 2019/0066416 A1 * | 2/2019 | Dhillon | G07F 15/005 |
| 2019/0199037 A1 * | 6/2019 | Ando | H01R 13/6397 |
| 2019/0378365 A1 * | 12/2019 | Jordan, III | B60L 53/60 |
| 2020/0009973 A1 * | 1/2020 | Doege | H01R 13/6397 |
| 2020/0169098 A1 * | 5/2020 | Spesser | H02J 7/00034 |
| 2020/0189408 A1 * | 6/2020 | Ko | B60L 53/16 |
| 2020/0331355 A1 * | 10/2020 | Choi | H02J 7/342 |
| 2021/0053454 A1 * | 2/2021 | Morich | B60L 53/16 |
| 2021/0394627 A1 * | 12/2021 | Lee | H01R 13/639 |
| 2022/0258629 A1 * | 8/2022 | Hanchett | B60L 53/62 |
| 2022/0355684 A1 | 11/2022 | Ando | |
| 2024/0291202 A1 * | 8/2024 | Wolf | H01R 13/6272 |

FOREIGN PATENT DOCUMENTS

| | | | | |
|---|---|---|---|---|
| CN | 104411532 B | * | 5/2018 | B60L 11/1818 |
| CN | 108099644 A | * | 6/2018 | |
| CN | 110014875 A | * | 7/2019 | B60L 53/16 |
| CN | 112009303 A | * | 12/2020 | B60L 1/006 |
| DE | 102011107900 A1 | * | 8/2012 | B60L 11/1844 |
| DE | 102011111444 A1 | * | 2/2013 | B60L 3/0069 |
| DE | 102014219744 A1 | * | 4/2015 | B60L 1/003 |
| DE | 102020118122 A1 | * | 2/2021 | |
| DE | 102020211990 A1 | * | 4/2021 | B60L 53/16 |
| DE | 102020132153 A1 | * | 6/2021 | B60L 53/16 |
| EP | 3065255 B1 | * | 9/2018 | B60L 11/1818 |
| EP | 3725583 A1 | * | 10/2020 | B60L 53/11 |
| EP | 3392075 B1 | * | 7/2021 | B60L 3/0069 |
| EP | 3964385 A1 | * | 3/2022 | B60L 50/60 |
| JP | 2015-012697 A | | 1/2015 | |
| JP | 5673652 B2 | | 2/2015 | |
| JP | 2016-181974 A | | 10/2016 | |
| JP | 2018042300 A | * | 3/2018 | B60L 53/16 |
| RU | 2505905 C2 | * | 1/2014 | B60L 53/14 |
| WO | WO-2011006775 A2 | * | 1/2011 | B60L 11/1818 |
| WO | WO-2012169743 A2 | * | 12/2012 | B60L 11/1805 |
| WO | 2014/068380 A2 | | 5/2014 | |
| WO | WO-2014163618 A1 | * | 10/2014 | H02J 7/00 |
| WO | WO-2014207531 A2 | * | 12/2014 | B60L 11/1842 |
| WO | WO-2015104749 A1 | * | 7/2015 | B60L 11/1816 |
| WO | WO-2016133452 A1 | * | 8/2016 | B60L 3/0015 |
| WO | WO-2018228930 A1 | * | 12/2018 | B60L 3/04 |
| WO | WO-2019073855 A1 | * | 4/2019 | B60K 1/04 |
| WO | WO-2019081245 A1 | * | 5/2019 | B60L 53/16 |

OTHER PUBLICATIONS

Non-Final Office Action dated Feb. 23, 2023, Issued to U.S. Appl. No. 17/873,550, filed Jul. 26, 2022.

Notice of Allowance dated Jan. 5, 2024, Issued to U.S. Appl. No. 17/873,550, filed Jul. 26, 2022.

Notice of Allowance dated May 2, 2022, Issued to U.S. Appl. No. 17/164,012, filed Feb. 1, 2021.

* cited by examiner

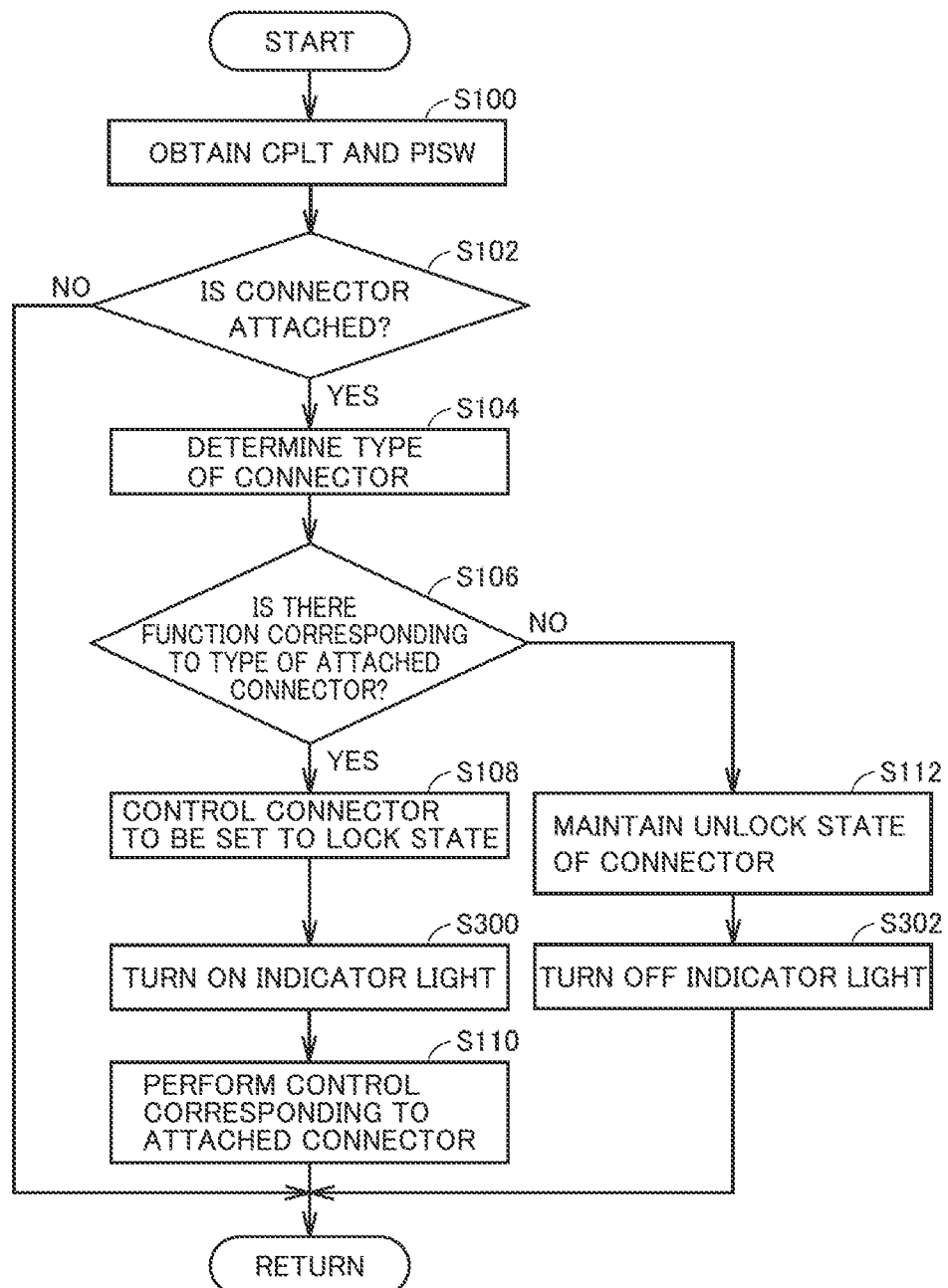

ELECTRICALLY POWERED VEHICLE AND METHOD FOR CONTROLLING ELECTRICALLY POWERED VEHICLE

CROSS REFERENCE TO RELATED APPLICATIONS

This nonprovisional application is a continuation application of U.S. patent application Ser. No. 17/873,550 filed Jul. 26, 2022, which is a continuation application of U.S. patent application Ser. No. 17/164,012 filed Feb. 1, 2021, now U.S. Pat. No. 11,427,100 issued Aug. 30, 2022, which claims priority to Japanese Patent Application No. 2020-019733 filed on Feb. 7, 2020 with the Japan Patent Office, the entire contents of which are hereby incorporated by reference.

BACKGROUND

Field

The present disclosure relates to control of an electrically powered vehicle equipped with a power storage device that can exchange power with an external electrical apparatus.

Description of the Background Art

In an electrically powered vehicle such as an electric car, a plug-in hybrid vehicle, or the like that uses a motor as a drive source, charging using a power supply external to the electrically powered vehicle (hereinafter referred to as external charging) is performed on a vehicle-mounted power storage device that supplies power to the drive source. This external charging is performed for example by attaching (connecting) a connector connected to the external power supply to an inlet provided in the electrically powered vehicle. Examples of a charging method for external charging include a charging method using alternating current (AC) power and a charging method using direct current (DC) power, and external charging using these charging methods may be performed using a common inlet. Further, a connector for discharging may be attached to the inlet. There is also an electrically powered vehicle in which, when such a connector is attached to an inlet, power feed to an electrical apparatus external to the electrically powered vehicle (hereinafter referred to as external power feed) can be performed using a vehicle-mounted power storage device as a power supply. Accordingly, it is required to correctly determine the type of a connector attached to an inlet.

For example, Japanese Patent Laying-Open No. 2015-012697 discloses a technique of determining whether a connector connected to an inlet is a charging connector or a discharging connector based on a signal provided via the inlet.

SUMMARY

An inlet may be provided with a lock mechanism that restricts removal of a connector (locks the connector) when the connector is attached to the inlet, to prevent the connector from being easily removed during a subsequent charging operation or discharging operation. However, if the lock mechanism is set to a state in which it locks the connector and the inlet irrespective of the type of the attached connector, a user may have a misunderstanding that the attached connector is accepted and an operation corresponding to the type of the attached connector will be performed. For example, if a connector for discharging is attached to an inlet of a vehicle for charging only and the lock mechanism is set to the state in which it locks the connector and the inlet, the user may have a misunderstanding that a discharging operation will be performed. Thus, there may occur a situation in which, although the user expects that a charging operation or a discharging operation will be performed, the charging operation or the discharging operation is not performed. Further, as communalization of the inlet proceeds, various types of connectors are to be attached to the inlet, significantly exhibiting such a problem.

An object of the present disclosure is to provide an electrically powered vehicle that controls a lock mechanism appropriately according to the type of a connector attached to an inlet, and a method for controlling the electrically powered vehicle.

An electrically powered vehicle in accordance with an aspect of the present disclosure includes: a power storage device; an inlet to which a connector of an external facility external to the vehicle can be attached; a lock mechanism that switches between a lock state and an unlock state, the lock state being a state in which removal of the connector from the inlet is restricted, the unlock state being a state in which removal of the connector from the inlet is permitted; a detection device that detects attachment of the connector to the inlet; and a control device that controls the lock mechanism using a result detected by the detection device. When the attachment of the connector to the inlet is detected, the control device obtains, from the external facility, first information about power which can be exchanged between the connector and the power storage device. When the control device determines based on the first information that the power can be exchanged between the connector and the power storage device, the control device sets the lock mechanism to the lock state. When the control device determines based on the first information that the power cannot be exchanged between the connector and the power storage device, the control device sets the lock mechanism to the unlock state.

With such a configuration, when it is determined based on the first information that the power cannot be exchanged between the connector and the power storage device, the lock mechanism is set to the unlock state. Thus, since the lock mechanism is not set to the lock state, it is possible to make a user recognize that an operation corresponding to the attached connector cannot be performed. This can suppress the user from having a misunderstanding on whether or not the operation corresponding to the attached connector can be performed. Further, when it is determined based on the first information that the power can be exchanged between the connector and the power storage device, the lock mechanism is set to the lock state. Thus, since the lock mechanism is set to the lock state, it is possible to make the user recognize that the operation corresponding to the attached connector can be performed.

In an embodiment, the control device includes a storage unit that stores second information about the power which can be exchanged between the connector and the power storage device. The control device determines whether or not the power can be exchanged between the connector and the power storage device, using a result of comparison between the first information and the second information.

With such a configuration, since the second information about the power which can be exchanged between the connector and the power storage device is stored in the storage unit of the control device, it is possible to accurately determine whether or not the power can be exchanged between the connector and the power storage device, using the result of comparison with the first information.

Further, in an embodiment, the first information includes at least one of information indicating that power to be exchanged between the connector and the inlet is AC power, and information indicating that the power to be exchanged between the connector and the inlet is DC power.

With such a configuration, it is possible to accurately determine whether or not the power can be exchanged between the connector and the power storage device, using the first information.

Further, in an embodiment, the first information includes at least one of information indicating that the power to be exchanged between the connector and the power storage device is charging power for charging the power storage device, and information indicating that the power to be exchanged between the connector and the power storage device is discharging power discharged from the power storage device.

With such a configuration, it is possible to accurately determine whether or not the power can be exchanged between the connector and the power storage device, using the first information.

Further, in an embodiment, the first information includes at least one of information about an upper limit value of a current in the power to be exchanged between the connector and the power storage device, information about a lower limit value of the current in the power to be exchanged between the connector and the power storage device, information about an upper limit value of a voltage in the power to be exchanged between the connector and the power storage device, and information about a lower limit value of the voltage in the power to be exchanged between the connector and the power storage device.

With such a configuration, it is possible to accurately determine whether or not the power can be exchanged between the connector and the power storage device, using the first information.

Further, in an embodiment, the control device determines whether or not the power can be exchanged between the connector and the power storage device, based on the first information and a state of charge of the power storage device.

With such a configuration, it is possible to accurately determine whether or not the power can be exchanged between the connector and the power storage device, using the first information and the state of charge of the power storage device.

Further, in an embodiment, when the control device cannot determine whether or not the power can be exchanged between the connector and the power storage device based on the first information, the control device sets the lock mechanism to the unlock state.

With such a configuration, since the lock mechanism is set to the unlock state when it is not possible to determine whether or not the power can be exchanged between the connector and the power storage device, this can suppress a situation where the lock mechanism is maintained in the lock state, for example, and thus the user cannot remove the connector from the inlet.

Further, in an embodiment, when the attachment of the connector to the inlet is detected, the control device determines whether or not the power can be exchanged between the connector and the power storage device based on the first information, and thereafter controls the lock mechanism using a result of determination.

With such a configuration, it is possible to make the user recognize whether or not an operation corresponding to the attached connector can be performed, based on whether the lock mechanism is set to the lock state or the unlock state when the connector is attached. This can suppress the user from having a misunderstanding on whether or not the operation corresponding to the attached connector will be performed.

Further, in an embodiment, when the attachment of the connector to the inlet is detected, the control device sets the lock mechanism to the lock state. When the control device determines based on the first information that the power cannot be exchanged between the connector and the power storage device, the control device sets the lock mechanism to the unlock state.

With such a configuration, since the lock mechanism is set to the unlock state, it is possible to make the user recognize that an operation corresponding to the attached connector cannot be performed. This can suppress the user from having a misunderstanding on whether or not the operation corresponding to the attached connector can be performed.

Further, in an embodiment, the electrically powered vehicle further includes a notification device that notifies information indicating whether or not the power can be exchanged between the connector and the power storage device.

With such a configuration, in addition to whether the lock mechanism is set to the lock state or the unlock state, whether or not the power can be exchanged between the connector and the power storage device are notified by the notification device. Thus, it is possible to make the user recognize whether or not an operation corresponding to the attached connector can be performed. This can suppress the user from having a misunderstanding on whether or not the operation corresponding to the attached connector will be performed.

A method for controlling an electrically powered vehicle in accordance with another aspect of the present disclosure is a method for controlling an electrically powered vehicle including a power storage device, an inlet, and a lock mechanism, a connector of an external facility external to the vehicle being attachable to the inlet, the lock mechanism switching between a lock state and an unlock state, the lock state being a state in which removal of the connector from the inlet is restricted, the unlock state being a state in which removal of the connector from the inlet is permitted. The control method includes: detecting attachment of the connector to the inlet; when the attachment of the connector to the inlet is detected, obtaining, from the external facility, first information about power which can be exchanged between the connector and the power storage device; when it is determined based on the first information that the power can be exchanged between the connector and the power storage device, setting the lock mechanism to the lock state; and when it is determined based on the first information that the power cannot be exchanged between the connector and the power storage device, setting the lock mechanism to the unlock state.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a flowchart showing an example of processing performed by the ECU in another variation.

DETAILED DESCRIPTION

Figure 1:
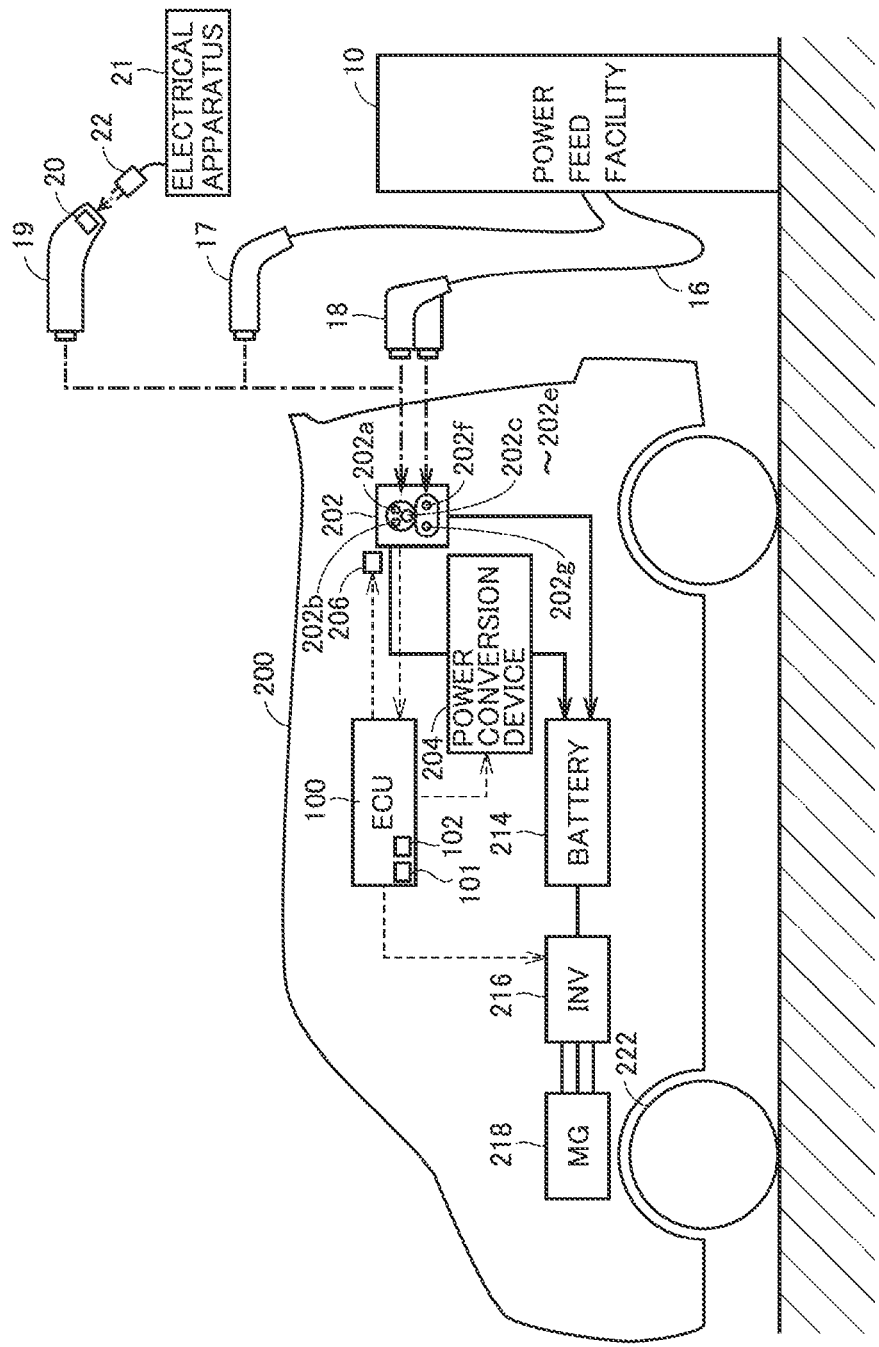
FIG. 1 is a view showing an example of a configuration of a vehicle.

Hereinafter, an embodiment of the present disclosure will be described in detail, with reference to the drawings. It should be noted that identical or corresponding parts in the drawings will be designated by the same reference numerals, and the description thereof will not be repeated.

In the following, a configuration of an electrically powered vehicle (hereinafter referred to as a vehicle) 200 in accordance with the present embodiment will be described. FIG. 1 is a view showing an example of a configuration of vehicle 200. Vehicle 200 includes an electrically powered vehicle such as a plug-in hybrid car, an electric car, or the like, for example, that can exchange power with an electrical apparatus external to vehicle 200. FIG. 1 assumes a case where vehicle 200 is parked at a parking space provided with a power feed facility 10.

As shown in FIG. 1, vehicle 200 includes an electronic control unit (ECU) 100, an inlet 202, a power conversion device 204, a lock mechanism 206, a battery 214, an inverter 216, and a motor generator (MG) 218.

Motor generator 218 is a three-phase AC rotating electric machine, for example, and has a function as an electric motor (a motor) and a function as a power generator (a generator). That is, motor generator 218 exchanges power with inverter 216.

For example, during driving of vehicle 200, motor generator 218 provides a rotating force to drive wheels 222 using power supplied from inverter 216. Drive wheels 222 are rotated by the rotating force provided by motor generator 218, and cause vehicle 200 to travel. It should be noted that the number of motor generators 218 is not limited to one, and a plurality of motor generators 218 may be provided.

Inverter 216 bidirectionally converts power between motor generator 218 and battery 214 in response to a control signal from ECU 100. For example, during driving of motor generator 218, inverter 216 converts DC power of battery 214 into AC power and supplies it to motor generator 218. Further, for example, during power generation of motor generator 218, inverter 216 converts AC power (regenerative power) generated in motor generator 218 into DC power and supplies it to battery 214. It should be noted that a converter for adjusting the voltage of inverter 216 and the voltage of battery 214 may be provided between inverter 216 and battery 214.

Battery 214 is a rechargeable power storage element, for example, and a secondary battery such as a nickel hydrogen battery or a lithium ion battery having a solid or liquid electrolyte is representatively applied thereto. Alternatively, battery 214 may be any power storage device that can store power, and for example, a large-capacity capacitor may be used instead of battery 214.

On battery 214, external charging using power supplied from power feed facility 10 is performed. External charging includes AC charging using DC power supplied by converting AC power supplied from an external facility (power feed facility 10) to inlet 202 in power conversion device 204, and DC charging using DC power supplied by supplying DC power supplied from power feed facility 10 to inlet 202 without passing through power conversion device 204.

Inlet 202 is provided in an exterior portion of vehicle 200 together with a cover (not shown) such as a lid, and is constituted such that various connectors described later can be attached thereto. Inlet 202 is constituted such that it can exchange power with a facility external to vehicle 200 (hereinafter referred to as an external facility). Here, an expression "power can be exchanged" indicates that at least one of charging or discharging is possible. That is, inlet 202 can receive supply of power to be used to charge battery 214, from the external facility. Further, inlet 202 enables supply (discharging) of power of battery 214 to the external facility.

Inlet 202 has a shape that allows attachment thereto of any of an AC charging connector 17 used for AC charging, a DC charging connector 18 used for DC charging, and an AC discharging connector 19 used for AC discharging. It should be noted that AC discharging indicates external discharging that supplies AC power from vehicle 200 to an external facility (for example, an electrical apparatus 21).

Inlet 202 is provided with AC connection portions 202*a* and 202*b*, DC connection portions 202*f* and 202*g*, and communication portions 202*c* to 202*e*.

When AC charging connector 17 of power feed facility 10 is attached to inlet 202, AC connection portions (see FIG. 2) of AC charging connector 17 are electrically connected to AC connection portions 202*a* and 202*b* of inlet 202, and communication portions (see FIG. 2) of AC charging connector 17 are connected to communication portions 202*c* to 202*e* of inlet 202.

When DC charging connector 18 of power feed facility 10 is attached to inlet 202, DC connection portions (not shown) of DC charging connector 18 are electrically connected to DC connection portions 202*f* and 202*g* of inlet 202, and communication portions (not shown) of DC charging connector 18 are connected to communication portions 202*c* to 202*e* of inlet 202.

Further, when AC discharging connector 19 is attached to inlet 202, AC connection portions (not shown) of AC discharging connector 19 are electrically connected to AC connection portions 202*a* and 202*b* of inlet 202, and communication portions (not shown) of AC discharging connector 19 are connected to communication portions 202*c* and 202*d* of inlet 202. One end of AC discharging connector 19 has a shape formed to be attachable to inlet 202, and the other end of AC discharging connector 19 is provided with a socket 20. Socket 20 has a shape that allows connection thereto of a plug 22 of electrical apparatus 21. It should be noted that electrical apparatus 21 includes an electrical household apparatus or the like operating at AC 100 V, for example.

Power conversion device 204 performs power conversion between battery 214 and inlet 202 in response to a control signal from ECU 100.

For example, when AC charging for battery 214 is performed with AC charging connector 17 being attached to inlet 202, power conversion device 204 converts AC power supplied from AC charging connector 17 into DC power, and charges battery 214 using the converted DC power.

Further, for example, when AC discharging using battery 214 is performed with AC discharging connector 19 being attached to inlet 202 and with plug 22 of electrical apparatus 21 being connected to socket 20 of AC discharging connector 19, power conversion device 204 converts DC power supplied from battery 214 into AC power, and supplies the converted AC power (for example, AC 100 V) to electrical apparatus 21.

Lock mechanism 206 switches between a state in which it restricts removal of a connector attached to inlet 202 to keep the connecter fixed to inlet 202 (a lock state), and a state in which it cancels the restriction on the removal of the connector to allow the removal of the connector from inlet 202 (an unlock state). Lock mechanism 206 is provided with, for example, an actuator that actuates a member to a position at which the member restricts movement of the connector attached to inlet 202 to achieve the lock state, or actuates the member to a position at which the member permits movement of the connector attached to inlet 202 to achieve the unlock state. That is, lock mechanism 206 switches between the lock state and the unlock state in response to a control signal from ECU 100.

ECU 100 includes a central processing unit (CPU) 101 and a memory (including a read only memory (ROM), a random access memory (RAM), or the like, for example) 102, and controls each device (for example, power conversion device 204, lock mechanism 206, or inverter 216) such that vehicle 200 enters a desired state, based on information such as maps, programs, and the like stored in memory 102 and information from various sensors. It should be noted that various controls performed by ECU 100 are not limited to be processed by software, but also can be processed by constructing dedicated hardware (electronic circuitry).

Further, when a connector (AC charging connector 17, DC charging connector 18, or AC discharging connector 19) is attached to inlet 202, ECU 100 performs communication processing for receiving predetermined information from a connector-side apparatus (power feed facility 10 or AC discharging connector 19). The predetermined information includes, for example, information about power which can be exchanged between power feed facility 10 and battery 214 (such as a connector connection signal PISW described later).

For example, when AC charging connector 17 is attached to inlet 202, ECU 100 receives, from power feed facility 10 (more specifically, AC charging connector 17), the predetermined information that includes information indicating that the communication portions of AC charging connector 17 are connected to communication portions 202c, 202d, and 202e of inlet 202, and power to be exchanged between attached AC charging connector 17 and inlet 202 is AC power, and information indicating that the power to be exchanged between AC charging connector 17 and inlet 202 is charging power for charging battery 214.

Alternatively, for example, when DC charging connector 18 is attached to inlet 202, ECU 100 receives, from power feed facility 10 (more specifically, DC charging connector 18), the predetermined information that includes information indicating that the communication portions of DC charging connector 18 are connected to communication portions 202c, 202d, and 202e of inlet 202, and power to be exchanged between DC charging connector 18 attached from power feed facility 10 and inlet 202 is DC power, and information indicating that the power to be exchanged between DC charging connector 18 and inlet 202 is charging power.

Alternatively, for example, when AC discharging connector 19 is attached to inlet 202, ECU 100 receives, from AC discharging connector 19, the predetermined information that includes information indicating that the communication portions of AC discharging connector 19 are connected to communication portions 202c and 202d of inlet 202, and power to be exchanged between attached AC discharging connector 19 and inlet 202 is AC power, and information indicating that the power to be exchanged between AC discharging connector 19 and inlet 202 is discharging power for discharging battery 214.

When AC charging connector 17 of power feed facility 10 is attached to inlet 202 of vehicle 200, power feed facility 10 supplies AC power to inlet 202. The AC power supplied to inlet 202 is converted into DC power by power conversion device 204. The converted DC power is supplied to battery 214, and battery 214 is charged.

When DC charging connector 18 of power feed facility 10 is attached to inlet 202 of vehicle 200, power feed facility 10 supplies DC power to inlet 202. The DC power supplied to inlet 202 is supplied to battery 214 without passing through power conversion device 204, and battery 214 is charged.

Figure 2:
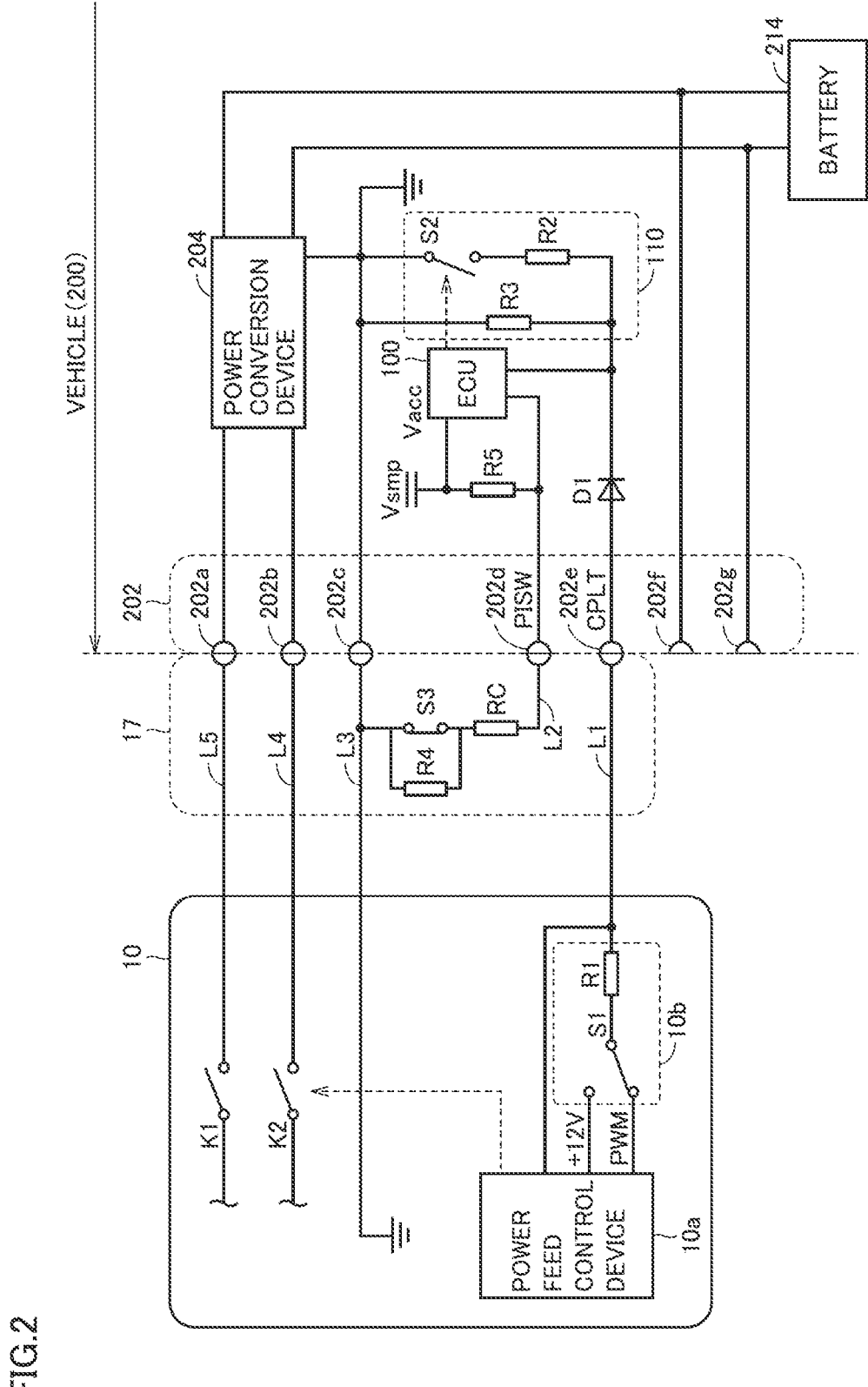
FIG. 2 is a view showing an example of a circuit configuration in a power feed facility and the vehicle.

Referring to FIG. 2, a circuit configuration in power feed facility 10 and vehicle 200 will be examined below, for an exemplary case where AC charging connector 17 is attached to inlet 202. FIG. 2 is a view showing an example of a circuit configuration in power feed facility 10 and vehicle 200.

Power feed facility 10 includes power feed relays K1 and K2, a power feed control device 10a, and an oscillation circuit 10b. When power feed relays K1 and K2 are in an open state, a power feed path is cut off. Further, when power feed relays K1 and K2 are in a closed state, power from an AC power supply (not shown) for power feed facility 10 can be supplied to vehicle 200 through AC charging connector 17 and inlet 202.

Oscillation circuit 10b outputs a pilot signal CPLT to ECU 100 through AC charging connector 17 and inlet 202. Pilot signal CPLT has a potential controlled by ECU 100, and is used as a signal for remotely controlling power feed relays K1 and K2 from ECU 100.

Power feed control device 10a controls power feed relays K1 and K2 based on the potential of pilot signal CPLT. Further, pilot signal CPLT is used as a signal for notifying a rated current during AC charging from oscillation circuit 10b to ECU 100.

Power feed control device 10a includes a CPU, a memory, and the like (all not shown). Power feed control device 10a detects the potential of pilot signal CPLT outputted by oscillation circuit 10b, and controls an operation of oscillation circuit 10b based on the detected potential of pilot signal CPLT.

When the connector is not connected to inlet 202, power feed control device 10a controls the operation of oscillation circuit 10b to output pilot signal CPLT that has a potential V0 (for example, +12 V) and does not oscillate.

Specifically, oscillation circuit 10b includes a switch S1 and a resistor R1, for example. One end of resistor R1 is connected to switch S1. The other end of resistor R1 is connected to one end of a signal line L1. The other end of signal line L1 is electrically connected to communication portion 202e when AC charging connector 17 is attached to inlet 202. Switch S1 is constituted to establish conduction between resistor R1 and one of a power supply having +12 V of power feed control device 10a and an oscillation device of power feed control device 10a. When the connector is not connected to inlet 202, power feed control device 10a controls switch S1 to establish conduction between resistor R1 and the power supply having +12 V. Thus, oscillation circuit 10b outputs pilot signal CPLT that has a potential of +12 V and does not oscillate, to signal line L1.

When the connector is connected to inlet 202, power feed control device 10a controls the operation of oscillation circuit 10b to output pilot signal CPLT that oscillates at prescribed frequency and duty cycle.

Specifically, for example, when AC charging connector 17 is connected, conduction is established between resistor R1 and a resistor R3 (described later) on the vehicle 200 side, and the potential of pilot signal CPLT decreases to V1 which is lower than V0. Accordingly, power feed control device 10a controls switch S1 to establish conduction between resistor R1 and the oscillation device. Thus, oscillation circuit 10b outputs pilot signal CPLT that has an upper limit value of its potential of V1 and oscillates at prescribed frequency and duty cycle, to signal line L1.

The duty cycle of pilot signal CPLT is preset according to the rated current. ECU 100 can obtain the rated current of power feed facility 10, using the duty cycle of pilot signal CPLT received via communication portion 202e.

When the upper limit value of the potential of pilot signal CPLT decreases to V2 (<V1), power feed control device 10a controls power feed relays K1 and K2 to be set to a closed state. Thereby, the power from the AC power supply is supplied to inlet 202 via AC charging connector 17. The upper limit value of the potential of pilot signal CPLT decreases to V2 by setting a switch S2 (described later) to a conductive state, for example.

AC charging connector 17 includes resistors R4 and RC, and a switch S3. One end of switch S3 is connected to a ground line L3. The other end of switch S3 is connected to one end of resistor RC. Resistor R4 is connected in parallel with switch S3. The other end of resistor RC is connected to a signal line L2. Signal line L2 is electrically connected to communication portion 202d when AC charging connector 17 is attached to inlet 202.

Switch S3 works in cooperation with a push button (not shown) provided to AC charging connector 17. When the push button is not pushed, switch S3 is in a closed state. When the push button is pushed, switch S3 is in an open state.

One end of a resistor R5 is connected to communication portion 202d, and the other end of resistor R5 is connected to a power supply Vsmp. ECU 100 is constituted such that it can obtain a potential between resistor R5 and communication portion 202d. Resistors RC, R4, and R5, switch S3, and power supply Vsmp constitute a connection detection circuit for detecting a connection state between AC charging connector 17 and inlet 202.

When AC charging connector 17 is not attached to inlet 202, a signal of a potential (V3) determined by a voltage of power supply Vsmp and a resistance value of resistor R5 is generated in signal line L2 as connector connection signal PISW.

When AC charging connector 17 is attached to inlet 202 and the push button is not operated, a signal of a potential (V4) determined by the voltage of power supply Vsmp and resistance values of resistors R5 and RC is generated in signal line L2 as connector connection signal PISW.

When the push button is operated with AC charging connector 17 being attached to inlet 202, a signal of a potential determined by the voltage of power supply Vsmp and resistance values of resistors R4, R5, and RC is generated in signal line L2 as connector connection signal PISW.

Therefore, ECU 100 can detect the connection state between AC charging connector 17 and inlet 202 by obtaining a potential of connector connection signal PISW. In addition, in AC charging connector 17, DC charging connector 18, and AC discharging connector 19, at least resistors RC are different. Accordingly, ECU 100 can obtain the type of a connected connector, based on the potential of connector connection signal PISW when the connector is connected to inlet 202.

Vehicle 200 further includes a resistance circuit 110. Resistance circuit 110 is a circuit for controlling the potential of pilot signal CPLT to be generated in signal line L1. Resistance circuit 110 includes resistors R2 and R3, and switch S2.

One end of resistor R2 is connected to ground line L3 through switch S2. The other end of resistor R2 is connected to signal line L1 in which pilot signal CPLT is generated. Resistor R3 is connected between signal line L1 and ground line L3. That is, one end of resistor R3 is connected to ground line L3. The other end of resistor R3 is connected to signal line L1. Switch S2 is turned on/off in response to a control signal from ECU 100.

When switch S2 is set to an OFF state (a cut-off state) in a case where AC charging connector 17 is attached to inlet 202, the potential of pilot signal CPLT is set to potential V1 determined by resistance values of resistors R1 and R3. When switch S2 is set to an ON state (a conductive state) in the case where AC charging connector 17 is attached to inlet 202, the potential of pilot signal CPLT is set to potential V2 determined by resistance values of resistors R1, R2, and R3.

When AC charging connector 17 is attached to inlet 202, ECU 100 requests power feed facility 10 to feed power and stop feeding power, by switching ON/OFF of switch S2 and changing the potential of pilot signal CPLT.

Specifically, ECU 100 requests power feed facility 10 to feed power, by setting switch S2 to an ON state and changing the potential of pilot signal CPLT from V1 to V2, for example. In addition, ECU 100 requests power feed facility 10 to stop feeding power, by setting switch S2 to an OFF state and changing the potential of pilot signal CPLT from V2 to V1, for example.

When switch S2 is set to an ON state and thereby power feed relays K1 and K2 are set to a closed state by power feed control device 10a, AC power is supplied from power feed facility 10 to power conversion device 204 via inlet 202. After completion of predetermined charging preparation processing, ECU 100 operates power conversion device 204 to convert the AC power into DC power and charge battery 214.

Figure 3:
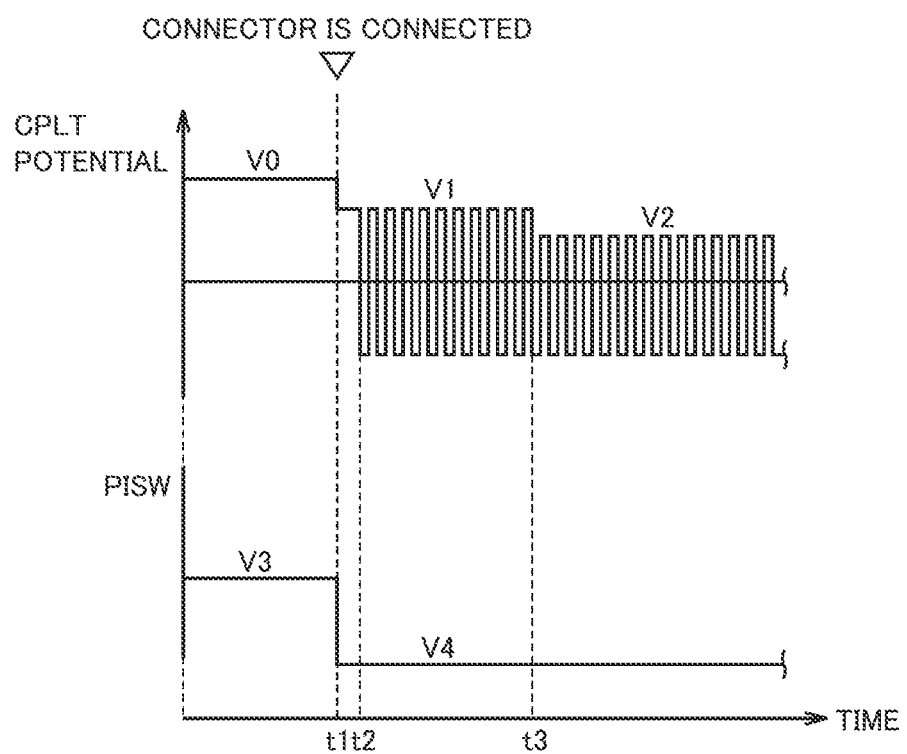
FIG. 3 is a timing chart showing an example of changes in a pilot signal CPLT and a connector connection signal PISW.

FIG. 3 is a timing chart showing an example of changes in pilot signal CPLT and connector connection signal PISW. The axis of abscissas in FIG. 3 represents time. The axis of ordinates in FIG. 3 represents the potential of pilot signal CPLT and the potential of connector connection signal PISW. The potential of pilot signal CPLT is obtained by power feed control device 10a and ECU 100. The potential of connector connection signal PISW is obtained by ECU 100. Further, as described above, potential V3 of connector connection signal PISW indicates that AC charging connector 17 is not attached to inlet 202. Potential V4 of connector connection signal PISW indicates that AC charging connector 17 is attached to inlet 202.

It is assumed that AC charging connector 17 is attached to inlet 202 at a time t1. Prior to time t1, the potential of pilot signal CPLT is V0, because AC charging connector 17 is not attached to inlet 202.

When AC charging connector 17 is attached to inlet 202 at time t1, the potential of pilot signal CPLT decreases to V1. Thereby, power feed control device 10a recognizes that AC charging connector 17 is attached to inlet 202, and controls switch S1 to establish conduction between resistor R1 and the oscillation device of power feed control device 10a at a time t2. Thereby, pilot signal CPLT oscillates, with an upper limit value of its potential being set to V1.

When the predetermined charging preparation processing is completed at a time t3, ECU 100 controls switch S2 to be set to a conductive state. Thereby, pilot signal CPLT oscillates, with an upper limit value of its potential being set to V2. When the upper limit value of the potential of pilot signal CPLT is set to V2, power feed control device 10a controls power feed relays K1 and K2 to be set to a conductive state. Thereby, AC power is supplied from power feed facility 10 to inlet 202.

It should be noted that, in a case where DC charging connector 18 of power feed facility 10 is attached to inlet 202, the case is different in that a DC power supply is connected to DC connection portions 202f and 202g through power feed relays (not shown), instead of connecting the AC power supply to AC connection portions 202a and 202b through power feed relays K1 and K2. Further, a range of the potential of connector connection signal PISW which can be obtained when DC charging connector 18 is connected to inlet 202 is different from a range of the potential of connector connection signal PISW which can be obtained when AC charging connector 17 is connected to inlet 202 (a predetermined range including potential V4). Furthermore, a range of the potential of connector connection signal PISW which can be obtained when AC discharging connector 19 is connected to inlet 202 is different from both the range of the potential of connector connection signal PISW which can be obtained when DC charging connector 18 is connected to inlet 202, and the range of the potential of connector connection signal PISW which can be obtained when AC charging connector 17 is connected to inlet 202.

When any of AC charging connector 17, DC charging connector 18, and AC discharging connector 19 is attached to inlet 202 in vehicle 200 having a configuration as described above, lock mechanism 206 is used to achieve the lock state, to prevent the connector from being easily removed during a subsequent charging operation or discharging operation as described above.

However, if lock mechanism 206 is set to the state in which it locks the connector and inlet 202 irrespective of the type of the connector attached to inlet 202, a user may have a misunderstanding that the attached connector is accepted and an operation corresponding to the type of the attached connector will be performed. For example, if a connector for discharging is attached to an inlet of a vehicle for charging only and lock mechanism 206 is set to the state in which it locks the connector and inlet 202, the user may have a misunderstanding that a discharging operation will be performed. Thus, there may occur a situation in which, although the user expects that a charging operation or a discharging operation will be performed, the charging operation or the discharging operation is not performed. Further, as communalization of inlet 202 proceeds, various types of connectors are to be attached to inlet 202, significantly exhibiting such a problem.

Accordingly, in the present embodiment, when attachment of a connector to inlet 202 is detected, ECU 100 obtains predetermined information about power which can be exchanged between the connector and battery 214, from an external facility (power feed facility 10 or AC discharging connector 19). When ECU 100 determines based on the predetermined information that the power can be exchanged between the connector and battery 214, ECU 100 sets lock mechanism 206 to the lock state. When ECU 100 determines based on the predetermined information that the power cannot be exchanged between the connector and battery 214, ECU 100 sets lock mechanism 206 to the unlock state.

With such a configuration, when it is determined based on the predetermined information that the power cannot be exchanged between the connector and battery 214, lock mechanism 206 is set to the unlock state. Thus, since lock mechanism 206 is not set to the lock state, it is possible to make the user recognize that an operation corresponding to the attached connector cannot be performed. This can suppress the user from having a misunderstanding on whether or not the operation corresponding to the attached connector can be performed. Further, when it is determined based on the predetermined information that the power can be exchanged between the connector and battery 214, lock mechanism 206 is set to the lock state. Thus, since lock mechanism 206 is set to the lock state, it is possible to make the user recognize that the operation corresponding to the attached connector can be performed.

Figure 4:
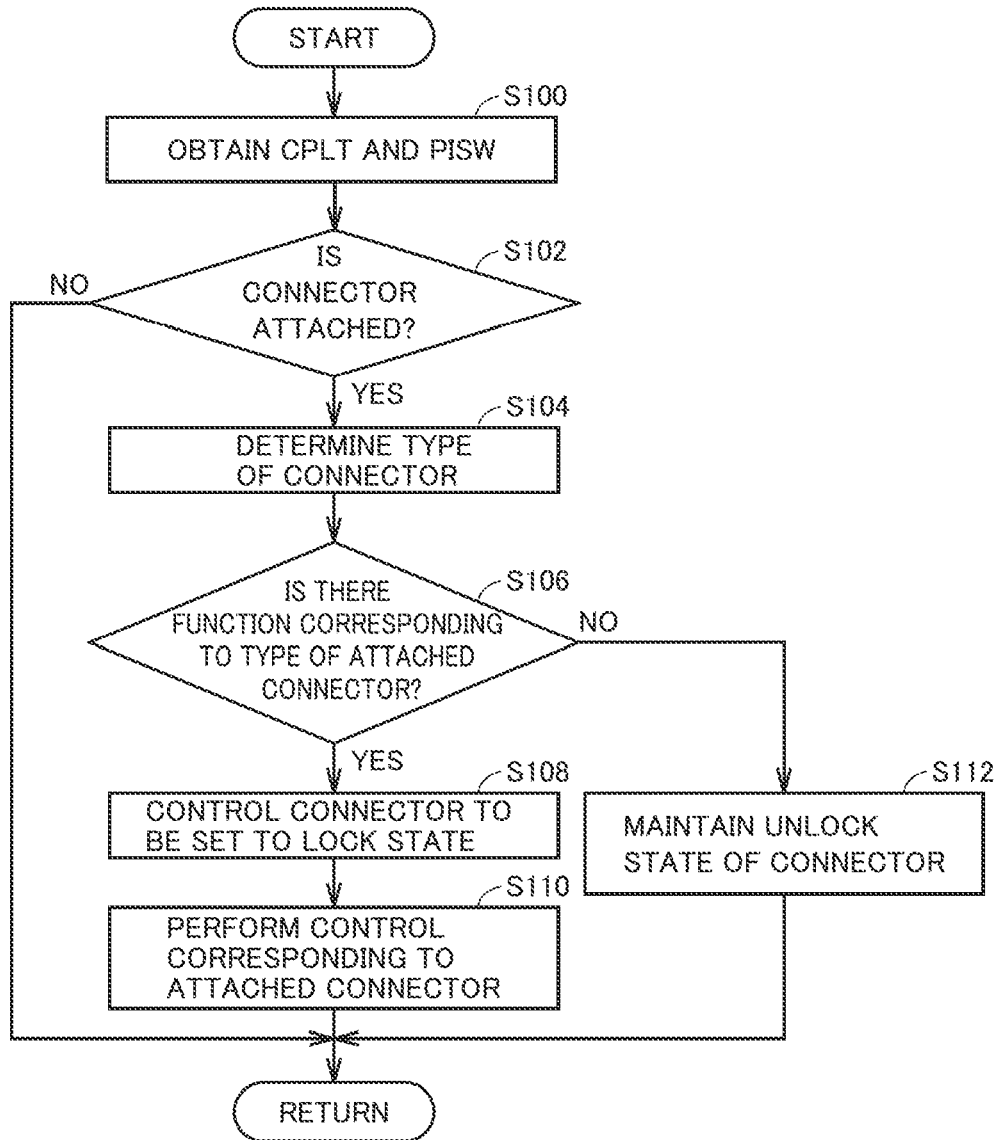
FIG. 4 is a flowchart showing an example of processing performed by an ECU.

Referring to FIG. 4, processing performed by ECU 100 of vehicle 200 in accordance with the present embodiment will be described below. FIG. 4 is a flowchart showing an example of processing performed by ECU 100. ECU 100 repeatedly performs the processing shown in FIG. 4 in a predetermined control cycle.

In step (hereinafter abbreviated as S) 100, ECU 100 obtains pilot signal CPLT and connector connection signal PISW.

In S102, ECU 100 determines whether or not a connector is attached to inlet 202. For example, when the potential of pilot signal CPLT changes from a potential within a range including V0 (corresponding to a fourth range described later) to a potential out of the range, ECU 100 determines that a connector is attached to inlet 202. When it is determined that a connector is attached (YES in S102), the processing proceeds to S104.

In S104, ECU 100 determines the type of the attached connector. That is, resistance values of resistors RC and resistance values of resistors R4 different depending on the types of the connectors are preset. Since different values are set as the resistance values of resistors RC and the resistance values of resistors R4, ranges of the potential of connector connection signal PISW which are different depending on the types of the connectors attached to inlet 202 can be obtained. ECU 100 determines the type of the connector based on within which of a plurality of preset ranges the potential of connector connection signal PISW obtained when the connector is attached to inlet 202 falls.

Figure 5:
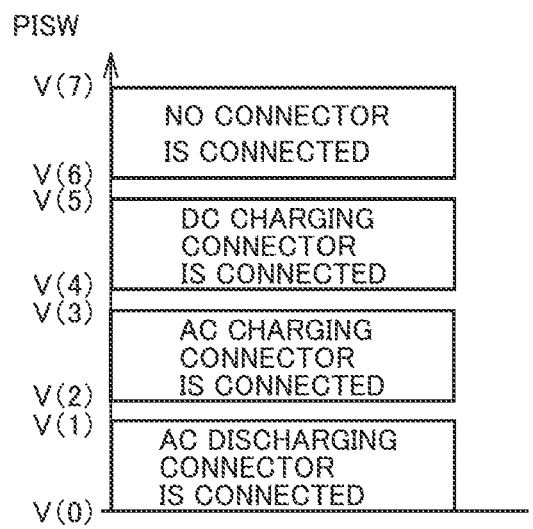
FIG. 5 is a view for describing ranges of a potential of connector connection signal PISW which can be obtained depending on the types and connection states of connectors.

FIG. 5 is a view for describing ranges of the potential of connector connection signal PISW which can be obtained depending on the types and connection states of the connectors. The axis of ordinates in FIG. 5 represents the potential of connector connection signal PISW.

As shown in FIG. 5, as the ranges of the potential of connector connection signal PISW which can be obtained depending on the types and connection states of the connectors, a first range from V(0) to V(1), a second range from V(2) to V(3), a third range from V(4) to V(5), and a fourth range from V(6) to V(7) are preset. The first range indicates a range of the potential of connector connection signal PISW which can be obtained when AC discharging connector 19 is attached to inlet 202. The second range indicates a range of the potential of connector connection signal PISW which can be obtained when AC charging connector 17 is attached to inlet 202 (including potential V4). The third range indicates a range of the potential of connector connection signal PISW which can be obtained when DC charging connector 18 is attached to inlet 202. The fourth range indicates a range of the potential of connector connection signal PISW which can be obtained when no connector is attached to inlet 202 (including potential V3).

For example, when the potential of connector connection signal PISW is a potential within the first range, ECU 100 determines that the connector attached to inlet 202 is AC discharging connector 19. In addition, for example, when the potential of connector connection signal PISW is a potential within the second range, ECU 100 determines that the connector attached to inlet 202 is AC charging connector 17. Further, for example, when the potential of connector connection signal PISW is a potential within the third range, ECU 100 determines that the connector attached to inlet 202 is DC charging connector 18. Further, for example, when the potential of connector connection signal PISW is a potential within the fourth range, ECU 100 determines that no connector is attached (no connector is connected) to inlet 202. Further, for example, when the potential of connector connection signal PISW is not a potential within any of the first to fourth ranges, ECU 100 determines that the type of the connector attached to inlet 202 is unclear.

In S106, ECU 100 determines whether or not there is a function corresponding to the type of the attached connector. In memory 102 of ECU 100, for example, information indicating types of available connectors is stored. When the determined type of the connector is included in the types of the available connectors stored beforehand in memory 102 of ECU 100, ECU 100 determines that there is a function corresponding to the type of the connected connector. When the determined type of the connector is not included in the types of the available connectors stored in memory 102, ECU 100 determines that there is no function corresponding to the type of the connected connector. Further, for example, when ECU 100 determines that the type of the connected connector is unclear, ECU 100 determines that there is no function corresponding to the type of the connected connector. Further, in the present embodiment, a connector used for DC discharging is not included in memory 102 of ECU 100 as a type of an available connector. It should be noted that DC discharging indicates external discharging that supplies DC power from DC connection portions 202f and 202g to an external facility. When it is determined that there is a function corresponding to the type of the connected connector (YES in S106), the processing proceeds to S108.

In S108, ECU 100 controls lock mechanism 206 to be set to the lock state in which the attached connector is locked at inlet 202.

In S110, ECU 100 performs control corresponding to the attached connector. For example, when AC charging connector 17 is attached to inlet 202, ECU 100 sets switch S2 to an ON state after the completion of the predetermined charging preparation processing. When the potential of pilot signal CPLT thereby changes to V2, power feed control device 10a sets power feed relays K1 and K2 between the AC power supply and AC charging connector 17 to an ON state. Thus, AC power is supplied from the AC power supply to inlet 202. On this occasion, ECU 100 operates power conversion device 204 to convert the AC power into DC power. Thereby, AC charging is performed on battery 214.

Alternatively, when DC charging connector 18 is attached to inlet 202, ECU 100 sets switch S2 to an ON state after the completion of the predetermined charging preparation processing. When the potential of pilot signal CPLT thereby changes to V2, the power feed relays between the DC power supply and DC charging connector 18 are set to an ON state. Thus, DC power is supplied from the DC power supply to battery 214 via inlet 202. Thereby, DC charging is performed on battery 214.

Further, when AC discharging connector 19 is attached to inlet 202, ECU 100 operates power conversion device 204 to convert the DC power of battery 214 into AC power. Thereby, when plug 22 of electrical apparatus 21 is connected to socket 20 of AC discharging connector 19, the AC power from power conversion device 204 is supplied to electrical apparatus 21. Thereby, AC discharging using battery 214 is performed. Electrical apparatus 21 operates using the AC power supplied by AC discharging. It should be noted that, when it is determined that there is no function corresponding to the type of the attached connector (NO in S106), the processing proceeds to S112.

In S112, ECU 100 controls lock mechanism 206 to maintain the unlock state in which removal of the attached connector is permitted.

An operation of ECU 100 of vehicle 200 based on the structure and the flowchart as described above will be described. It should be noted that, as described above, the connector used for DC discharging is not included as a type of an available connector stored in memory 102 of ECU 100.

<Case where AC Charging Connector 17 is Attached to Inlet 202>

For example, it is assumed that the user attaches AC charging connector 17 of power feed facility 10 to inlet 202.

When pilot signal CPLT and connector connection signal PISW are obtained (S100) and the potential of obtained connector connection signal PISW is a potential within the fourth range, it is determined that no connector is attached to inlet 202 (NO in S102). On the other hand, when the potential of connector connection signal PISW changes from the potential within the fourth range to a potential within the second range (i.e., out of the fourth range), it is determined that a connector is attached to inlet 202 (YES in S102). Further, since the potential of connector connection signal PISW is the potential within the second range, it is determined that the type of the attached connector is AC charging connector 17 (S104).

Since the connector used for AC charging is included as a type of an available connector stored in memory 102 of ECU 100, it is determined that there is a function corresponding to the type of the attached connector (YES in S106), and lock mechanism 206 is controlled such that AC charging connector 17 is set to a lock state with respect to inlet 202 (S108). Then, AC charging is started (S110). Thus, AC power supplied from power feed facility 10 is converted into DC power in power conversion device 204 and is supplied to battery 214, and battery 214 is charged.

<Case where DC Charging Connector 18 is Attached to Inlet 202>

For example, it is assumed that the user attaches DC charging connector 18 of power feed facility 10 to inlet 202.

When pilot signal CPLT and connector connection signal PISW are obtained (S100) and the potential of obtained connector connection signal PISW changes from the potential within the fourth range to a potential within the third range (i.e., out of the fourth range), it is determined that a connector is attached to inlet 202 (YES in S102). Further, since the potential of connector connection signal PISW is the potential within the third range, it is determined that the type of the attached connector is DC charging connector 18 (S104).

Since the connector used for DC charging is included as a type of an available connector stored in memory 102 of ECU 100, it is determined that there is a function corresponding to the type of the attached connector (YES in S106), and lock mechanism 206 is controlled such that DC charging connector 18 is set to the lock state with respect to inlet 202 (S108). Then, DC charging is started (S110). Thus, DC power supplied from power feed facility 10 is supplied to battery 214, and battery 214 is charged.

<Case where AC Discharging Connector 19 is Attached to Inlet 202>

For example, it is assumed that the user attaches AC discharging connector 19 to inlet 202.

When pilot signal CPLT and connector connection signal PISW are obtained (S100) and the potential of obtained connector connection signal PISW changes from the potential within the fourth range to a potential within the first range (i.e., out of the fourth range), it is determined that a connector is attached to inlet 202 (YES in S102). Further, since the potential of connector connection signal PISW is the potential within the first range, it is determined that the type of the attached connector is AC discharging connector 19 (S104).

Since the connector used for AC discharging is included as a type of an available connector stored in memory 102 of ECU 100, it is determined that there is a function corresponding to the type of the attached connector (YES in S106), and lock mechanism 206 is controlled such that AC discharging connector 19 is set to the lock state with respect to inlet 202 (S108). Then, AC discharging is started (S110). Thus, DC power of battery 214 is converted into AC power by power conversion device 204. When plug 22 of electrical apparatus 21 is attached to socket 20 of AC discharging connector 19, electrical apparatus 21 operates using the AC power converted by power conversion device 204.

<Case where a Connector for DC Discharging is Attached to Inlet 202>

For example, it is assumed that the user attaches a connector for DC discharging to inlet 202.

When pilot signal CPLT and connector connection signal PISW are obtained (S100) and the potential of obtained connector connection signal PISW changes from the potential within the fourth range to a potential out of the fourth range, it is determined that a connector is attached to inlet 202 (YES in S102). Further, when the potential of connector connection signal PISW is not a potential within any of the first, second, and third ranges, it is determined that the type of the attached connector is unclear (S104). Thus, it is determined that there is no function corresponding to the type of the attached connector (NO in S106), and lock mechanism 206 is controlled to maintain the unlock state in which removal of the connector from inlet 202 is permitted (S112).

As described above, according to the electrically powered vehicle in accordance with the present embodiment, when the type of the attached connector (corresponding to first information) obtained based on the potential of connector connection signal PISW is not included in the types of the available connectors (corresponding to second information and information indicating that power can be exchanged between the connector and battery 214) stored in memory 102 of ECU 100, lock mechanism 206 is set to the unlock state. Thus, since lock mechanism 206 is not set to the lock state, it is possible to make the user recognize that an operation corresponding to the attached connector cannot be performed. This can suppress the user from having a misunderstanding on whether or not the operation corresponding to the attached connector can be performed. Further, when the type of the attached connector is included in the types of the available connectors stored in memory 102 of ECU 100, lock mechanism 206 is set to the lock state. Thus, since lock mechanism 206 is set to the lock state, it is possible to make the user recognize that the operation corresponding to the attached connector can be performed. Therefore, an electrically powered vehicle that controls a lock mechanism appropriately according to the type of a connector attached to an inlet, and a method for controlling the electrically powered vehicle can be provided.

Variations will be described below.

Although the above embodiment has described that the type of the connector is determined using the potential of connector connection signal PISW, an element such as an upper limit value or a lower limit value of a current to be exchanged, or an upper limit value or a lower limit value of a voltage, for example, may be added to the type of the connector, and then the type of the connector may be determined using the potential of connector connection signal PISW.

For example, when there are a connector for AC charging in which the upper limit value of the current is set to Ia, and another connector for AC charging in which the upper limit value of the current is set to Ib which is higher than Ia, these two connectors can be distinguished using the potential of connector connection signal PISW, by setting resistors RC in these two connectors to have different values.

Figure 6:
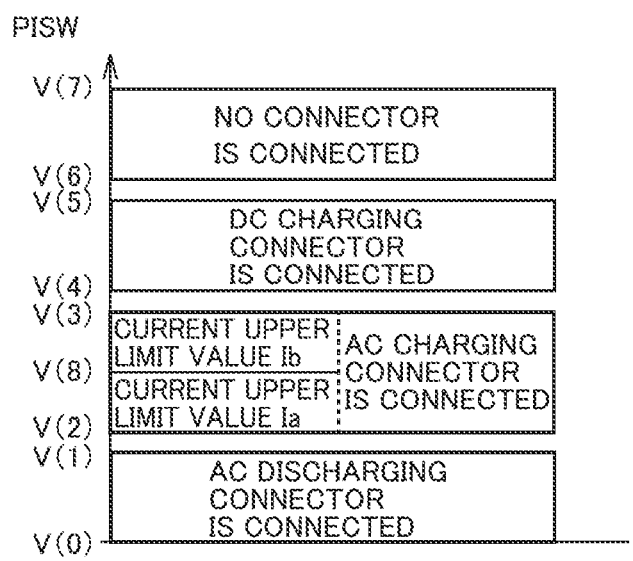
FIG. 6 is a view for describing ranges of the potential of connector connection signal PISW which can be obtained depending on the types and connection states of the connectors in a variation.

FIG. 6 is a view for describing ranges of the potential of connector connection signal PISW which can be obtained depending on the types and connection states of the connectors in a variation. The axis of ordinates in FIG. 6 represents the potential of connector connection signal PISW.

As shown in FIG. 6, as the ranges of the potential of connector connection signal PISW which can be obtained depending on the types and connection states of the connectors, the first range from V(0) to V(1), the second range from V(2) to V(3), the third range from V(4) to V(5), and the fourth range from V(6) to V(7) are preset. The first range indicates a range of the potential of connector connection signal PISW which can be obtained when AC discharging connector 19 is attached to inlet 202. The second range indicates a range of the potential of connector connection signal PISW which can be obtained when AC charging connector 17 is attached to inlet 202 (including potential V4). The third range indicates a range of the potential of connector connection signal PISW which can be obtained when DC charging connector 18 is attached to inlet 202. The fourth range indicates a range of the potential of connector connection signal PISW which can be obtained when no connector is attached to inlet 202 (including potential V3).

Further, as shown in FIG. 6, the second range is subdivided into a range from V(2) to V(8) and a range from V(8) to V(3). The range from V(2) to V(8) indicates a range of the potential of connector connection signal PISW which can be obtained when a connector in which a charging current during AC charging is limited at upper limit value Ia is attached to inlet 202. The range from V(8) to V(3) indicates a range of the potential of connector connection signal PISW which can be obtained when a connector in which a charging current during AC charging is limited at upper limit value Ib (>Ia) is attached to inlet 202.

For example, when the potential of connector connection signal PISW is a potential within the second range and is a potential within the range from V(2) to V(8), ECU 100 determines that the connector attached to inlet 202 is the connector used for AC charging in which the upper limit value of the current is set to Ia. Further, when the potential of connector connection signal PISW is a potential within the second range and is a potential within the range from V(8) to V(3), ECU 100 determines that the connector attached to inlet 202 is the connector used for AC charging in which the upper limit value of the current is set to Ib.

With such a configuration, when the attached connector of the power feed facility is a connector that is also used for AC charging but is intended for charging exceeding the upper limit value of the current or the upper limit value of the voltage available in vehicle 200, lock mechanism 206 is controlled to maintain the unlock state. Thus, it is possible to make the user recognize that an operation corresponding to the attached connector cannot be performed.

Figure 7:
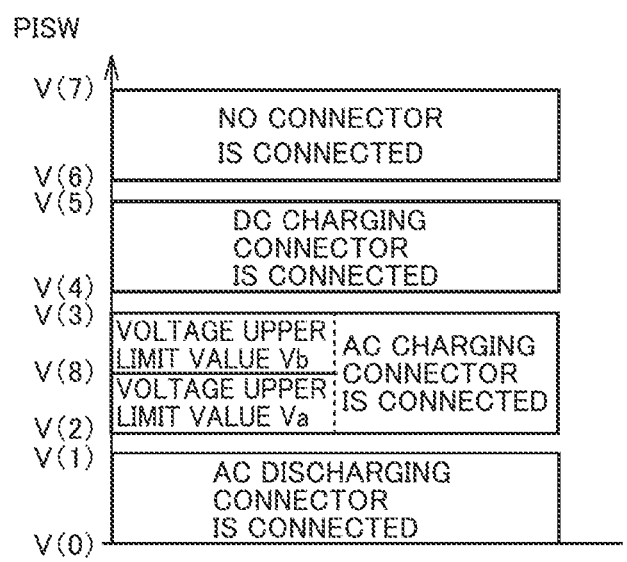
FIG. 7 is a view for describing ranges of the potential of connector connection signal PISW which can be obtained depending on the types and connection states of the connectors in another variation.

It should be noted that, although FIG. 6 illustrates the case where the second range of the potential of connector connection signal PISW which can be obtained when the connector used for AC charging is attached is subdivided into two ranges based on current upper limit values, the second range may be further subdivided into a plurality of ranges, or the third range of the potential of connector connection signal PISW which can be obtained when the connector used for DC charging is attached may be subdivided into a plurality of ranges based on current upper limit values. Alternatively, as shown in FIG. 7, the second range may be subdivided into two ranges or a plurality of ranges based on voltage upper limit values Va and Vb instead of current upper limit values Ia and Ib. FIG. 7 is a view for describing ranges of the potential of connector connection signal PISW which can be obtained depending on the types and connection states of the connectors in another variation. Unlike FIG. 6 showing that the second range is subdivided based on current upper limit values Ia and Ib, FIG. 7 shows that the second range is subdivided based on voltage upper limit values Va and Vb. With such a configuration, it is possible to determine whether the connector attached to inlet 202 is a connector used for AC charging in which the upper limit value of the voltage is set to Va, or a connector used for AC charging in which the upper limit value of the voltage is set to Vb.

Further, although FIG. 6 illustrates the case where the second range of the potential of connector connection signal PISW which can be obtained when the connector used for AC charging is attached is subdivided into two ranges based on two current upper limit values, the second range may be subdivided into two ranges based on two current lower limit values.

Further, although FIG. 7 illustrates the case where the second range of the potential of connector connection signal PISW which can be obtained when the connector used for AC charging is attached is subdivided into two ranges based on two voltage upper limit values, the second range may be subdivided into two ranges based on two voltage lower limit values.

With such a configuration, when power can be exchanged with an external facility only at more than or equal to a constant current (corresponding to a current lower limit value) or a constant voltage (corresponding to a voltage lower limit value), but a current upper limit value available on the vehicle side is lower than the constant current or a voltage upper limit value available on the vehicle side is lower than the constant voltage, lock mechanism 206 is controlled to maintain the unlock state. Thus, it is possible to make the user recognize that an operation corresponding to the attached connector cannot be performed.

Further, the above embodiment has described that only the types of connectors available in vehicle 200 are stored in memory 102 of ECU 100, and thus ECU 100 can determine only the types of connectors available in vehicle 200, and, for the type of a connector unavailable in vehicle 200 (such as the connector for DC discharging, for example), ECU 100 determines that the type of the connector is unclear. However, ECU 100 may also determine the type of an unavailable connector.

Further, although the above embodiment has described that lock mechanism 206 is controlled after the type of the connector is determined, lock mechanism 206 may be controlled to be set to the lock state when a connector is attached, for example.

Figure 8:
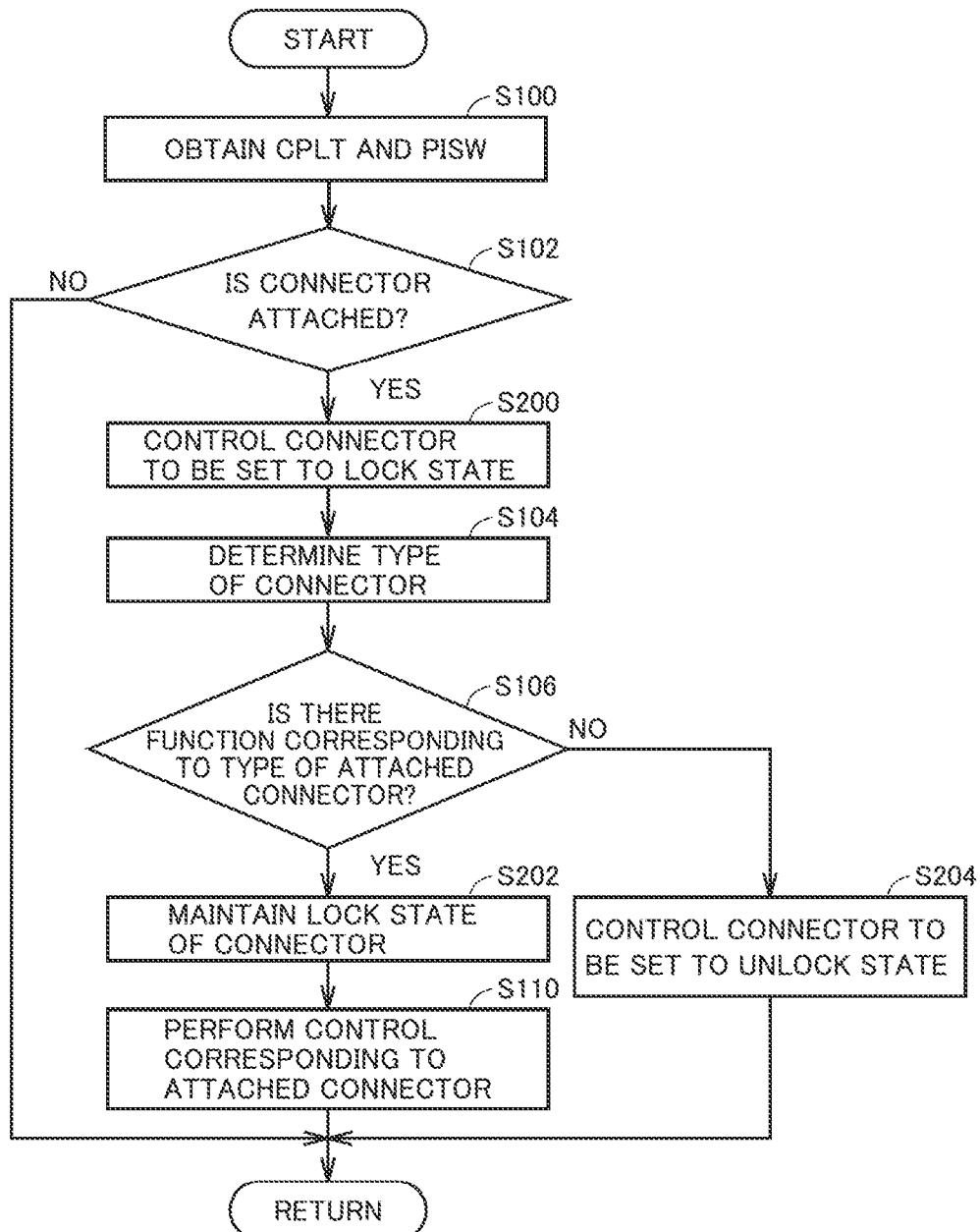
FIG. 8 is a flowchart showing an example of processing performed by the ECU in a variation.

FIG. 8 is a flowchart showing an example of processing performed by ECU 100 in a variation.

It should be noted that, in the flowchart of FIG. 8, steps identical to those in the flowchart of FIG. 4 are designated by the same step numbers. Accordingly, the detailed description thereof will not be repeated.

When it is determined that a connector is attached (YES in S102), the processing proceeds to S200. In S200, ECU 100 controls lock mechanism 206 to be set to the lock state in which the attached connector is locked at inlet 202. Then, the processing proceeds to S104.

When it is determined that there is a function corresponding to the type of the attached connector (YES in S106), the processing proceeds to S202. In S202, ECU 100 controls lock mechanism 206 to maintain the lock state. When it is determined that there is no function corresponding to the type of the attached connector (NO in S106), the processing proceeds to S204. In S204, ECU 100 controls lock mechanism 206 to be set to the unlock state in which removal of the attached connector is permitted.

With such a configuration, since lock mechanism 206 is set to the unlock state, it is possible to make the user recognize that an operation corresponding to the attached connector cannot be performed. This can suppress the user from having a misunderstanding on whether or not the operation corresponding to the attached connector can be performed.

Further, although the above embodiment has described that lock mechanism 206 is controlled after the type of the connector is determined, lock mechanism 206 may be controlled for example as described below. For example, the state of lock mechanism 206 can be manually switched when a connector is attached to inlet 202, and thereafter, in a case where it is determined that there is a function corresponding to the type of attached connector, lock mechanism 206 may maintain the lock state when it is in the lock state, and may switch to the lock state when it is in the unlock state. In addition, in a case where it is determined that there is no function corresponding to the type of attached connector, lock mechanism 206 may switch to the unlock state when it is in the lock state, and may maintain the unlock state when it is in the unlock state.

Further, although the above embodiment has described that lock mechanism 206 is controlled according to the availability of the attached connector, the user may be notified of the availability of the attached connector, in addition to control of lock mechanism 206.

Figure 9:
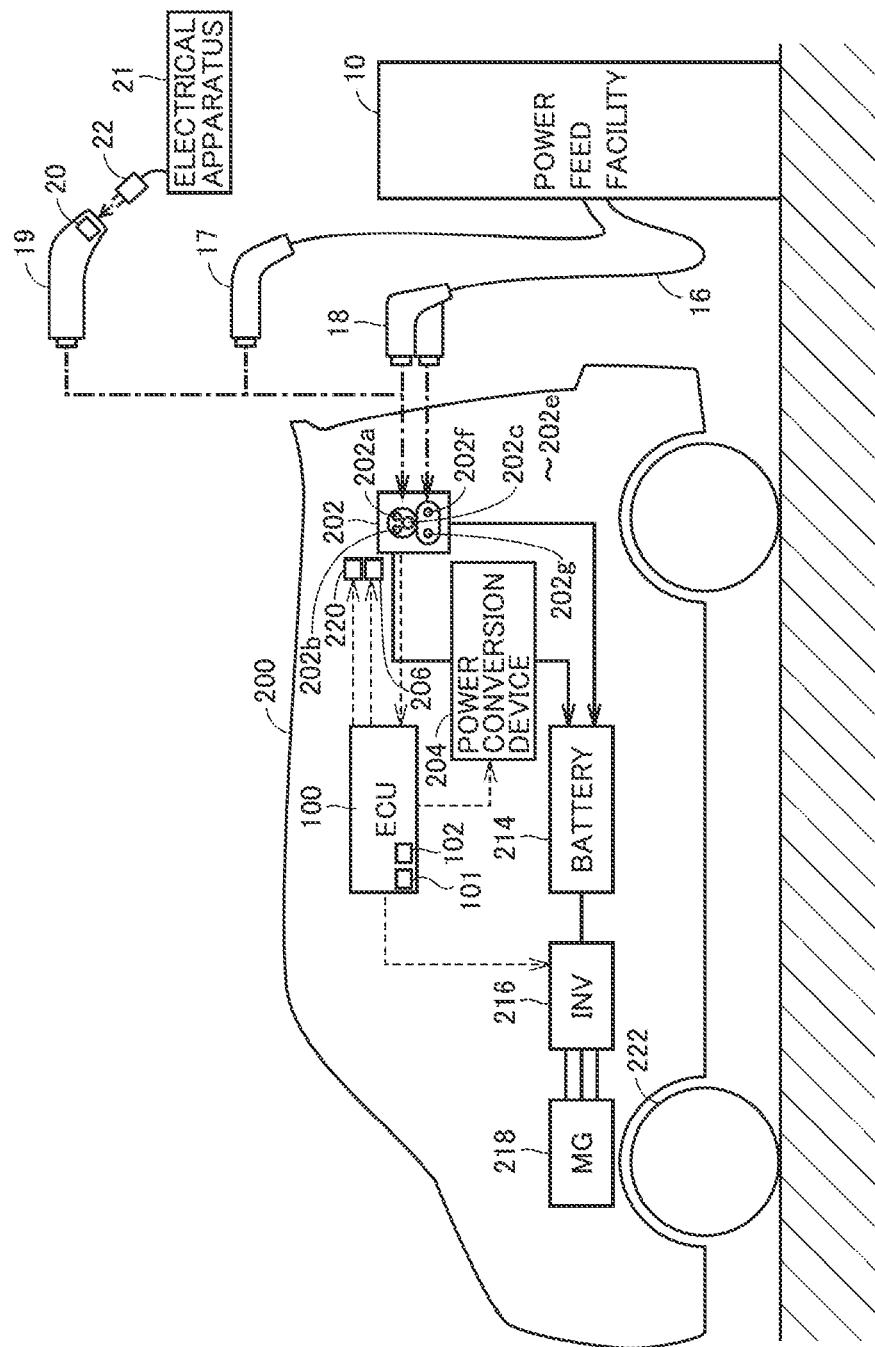
FIG. 9 is a view showing an example of a configuration of the vehicle in a variation.

FIG. 9 is a view showing an example of a configuration of vehicle 200 in a variation. Vehicle 200 shown in FIG. 9 is different from vehicle 200 shown in FIG. 1 in that vehicle 200 further includes a notification device 220. Since the components other than that are the same as those in FIG. 1, the detailed description thereof will not be repeated.

Notification device 220 displays predetermined information according to a control signal from ECU 100, for example. Notification device 220 is, for example, an indicator constituted such that it can switch between a lighting state and a non-lighting state. Notification device 220 is provided, for example, at a position which is adjacent to inlet 202 and is viewable when the user attaches a connector to inlet 202.

When it is determined that there is a function corresponding to the type of the attached connector, ECU 100 controls lock mechanism 206 to be set to the lock state, and sets the indicator to the lighting state. When it is determined that there is no function corresponding to the type of the attached connector, ECU 100 controls lock mechanism 206 to be set to the unlock state, and sets the indicator to the non-lighting state. It should be noted that the indicator may be constituted to emit blue light when it is determined that there is a function corresponding to the type of the attached connector, and emit red light when it is determined that there is no function corresponding to the type of the attached connector. Further, instead of an indicator, notification device 220 may be a display device that displays text information, or may be a voice generation device that generates predetermined information as voice. The text information or the predetermined information generated as voice may include, for example, information that there is a function corresponding to the type of the attached connector, or information that there is no such function.

FIG. 10 is a flowchart showing an example of processing performed by ECU 100 in another variation.

It should be noted that, in the flowchart of FIG. 10, steps identical to those in the flowchart of FIG. 4 are designated by the same step numbers. Accordingly, the detailed description thereof will not be repeated.

When lock mechanism 206 is controlled such that the connector is set to the lock state (S108), the processing proceeds to S300. In S300, ECU 100 sets the indicator constituting notification device 220 to the lighting state. When lock mechanism 206 is controlled to maintain an unlock state of the connector (S112), the processing proceeds to S302. In S302, ECU 100 maintains the non-lighting state of the indicator constituting notification device 220.

With such a configuration, in addition to information as to whether lock mechanism 206 is set to the lock state or the unlock state, information as to whether or not power can be exchanged between the connector and battery 214 (that is, whether the indicator is in the lighting state or the non-lighting state) are notified by notification device 220. Thus, it is possible to make the user recognize whether or not an operation corresponding to the attached connector can be performed. This can suppress the user from having a misunderstanding on whether or not the operation corresponding to the attached connector will be performed.

Further, although the above embodiment has described that lock mechanism 206 is controlled according to the availability of the attached connector (that is, according to whether or not power can be exchanged between the connector and battery 214), lock mechanism 206 may be controlled to be set to the unlock state when it is not possible to determine whether or not power can be exchanged between the connector and battery 214.

For example, when information received from the attached connector has an abnormality, ECU 100 cannot determine whether or not power can be exchanged between the connector and battery 214, and thus ECU 100 controls lock mechanism 206 to be set to the unlock state.

For example, when an amount of change in the potential of connector connection signal PISW within a predetermined period exceeds a threshold value, or when the potential of connector connection signal PISW has an unusual value, ECU 100 determines that the information received from the attached connector has an abnormality.

This can suppress processing for charging or discharging from being stopped due to the abnormality of the received information, with lock mechanism 206 remaining in the lock state, for example. Accordingly, the user can remove the connector from the inlet when such an abnormality occurs.

Further, although the above embodiment has described that lock mechanism 206 is controlled according to the availability of the type of the attached connector, lock mechanism 206 may be controlled according to whether or not a predetermined condition is satisfied, instead of or in addition to the availability of the type of the attached connector.

Examples of the predetermined condition include a condition that the SOC of battery 214 is lower than a threshold value during external charging. For example, when it is determined that there is a function corresponding to the type of the attached connector, and the predetermined condition is satisfied, ECU 100 may control lock mechanism 206 to be set to the lock state. Further, for example, when it is determined that there is a function corresponding to the type of the attached connector, but the attached connector is a connector used for external charging, and the SOC of battery 214 is more than or equal to the threshold value, ECU 100 may control lock mechanism 206 to maintain the unlock state.

Alternatively, examples of the predetermined condition include a condition that the SOC of battery 214 is higher than a threshold value during external discharging. For example, when it is determined that there is a function corresponding to the type of the attached connector, and the predetermined condition is satisfied, ECU 100 may control lock mechanism 206 to be set to the lock state. Further, for example, when it is determined that there is a function corresponding to the type of the attached connector, but the attached connector is a connector used for external discharging, and the SOC of battery 214 is less than or equal to the threshold value, ECU 100 may control lock mechanism 206 to maintain the unlock state.

With such a configuration, when charging or discharging is not possible due to the SOC of battery 214, lock mechanism 206 is controlled to maintain the unlock state. Thus, since lock mechanism 206 is set to the unlock state, it is possible to make the user recognize that an operation corresponding to the attached connector cannot be performed.

Further, although the above embodiment has described an exemplary case where AC charging, DC charging, and AC discharging are possible in vehicle 200, it is satisfactory as long as at least two of AC charging, DC charging, AC discharging, and DC discharging are possible, and the present disclosure is not particularly limited to the case where AC charging, DC charging, and AC discharging are possible.

It should be noted that the variations described above may be implemented by combining some or all of them as appropriate.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. An electrically powered vehicle comprising:
a power storage device;
an inlet to which a connector of an external facility external to the vehicle can be attached;
a lock mechanism that locks the connector in the inlet; and
an electronic control unit configured to control the lock mechanism between a lock state and an unlock state, in the lock state the connector is restricted from being removed from the inlet, and in the unlock state the connector is permitted from being removed from the inlet, wherein:
the electronic control unit is configured to control the lock mechanism into the lock state to lock the connector to the inlet in response to detecting attachment of the connector to the inlet;
the electronic control unit is configured to:
determine whether a type of the connector is included in a list of types of available connectors stored in a memory of the electronic control unit prior to exchanging power between the connector and the power storage device of the electrically powered vehicle; and
control the lock mechanism into the lock state and maintain the lock mechanism in the lock state to lock the connector to the inlet in response to determining that the type of the connector is included in the list of types of available connectors stored in the memory, and
the electrically powered vehicle is configured to receive at least one of information about a maximum limit value of a current, information about a minimum limit value of the current, information about a maximum limit value of a voltage, and information about a minimum limit value of the voltage from the external facility.

2. The electrically powered vehicle according to claim 1, wherein:
the electronic control unit is configured to control the lock mechanism into the lock state to lock the connect to the inlet in response to detecting attachment of the connector to the inlet based on a pilot signal and a connector connection signal, and
when the connector is plugged into the inlet, a potential of the pilot signal changes from a first state to a second state.

* * * * *